(12) United States Patent
Long et al.

(10) Patent No.: US 8,720,295 B2
(45) Date of Patent: May 13, 2014

(54) MANIPULATOR

(75) Inventors: Bo Long, Shenzhen (CN); Xiao-Ming Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 935 days.

(21) Appl. No.: 12/502,429

(22) Filed: Jul. 14, 2009

(65) Prior Publication Data

US 2010/0163689 A1  Jul. 1, 2010

(30) Foreign Application Priority Data

Dec. 27, 2008 (CN) .......................... 200810306606.2

(51) Int. Cl.
  *B25J 18/00* (2006.01)
(52) U.S. Cl.
  USPC ........................................ 74/490.02; 901/27
(58) Field of Classification Search
  USPC .............................. 74/490.02, 490.01; 901/27
  See application file for complete search history.

(56) References Cited

U.S. PATENT DOCUMENTS

| 4,277,641 | A | * | 7/1981 | Bauer et al. | .................... | 174/661 |
| 4,969,795 | A | * | 11/1990 | Toyoda et al. | ............. | 414/744.2 |
| 5,115,690 | A | * | 5/1992 | Torii et al. | .................. | 74/490.02 |
| 6,250,174 | B1 | * | 6/2001 | Terada et al. | ............. | 74/490.02 |
| 7,847,190 | B1 | * | 12/2010 | Gretz | .............................. | 174/66 |
| 8,245,592 | B2 | * | 8/2012 | Pan et al. | ................... | 74/490.02 |

FOREIGN PATENT DOCUMENTS

| TW | 288679 | 10/1996 |
| WO | WO9826906 A1 | 6/1998 |

* cited by examiner

*Primary Examiner* — David M Fenstermacher
*Assistant Examiner* — Terence Boes
(74) *Attorney, Agent, or Firm* — Novak Druce Connolly Bove + Quigg LLP

(57) ABSTRACT

A manipulator includes a mechanical arm, a cable positioned in the mechanical arm, at least one cable protection device, and a plurality of fasteners. The at least one cable protection device is fixed to the mechanical arm by the fasteners. The mechanical arm defines a receiving slot, in which the cable is partially received. The at least one cable protection device includes a fixing member and a resilient arm. The fixing member is connected to the mechanical arm, opposite to the receiving slot. The resilient arm is capable of swinging relative to the fixing member.

11 Claims, 2 Drawing Sheets

MANIPULATOR

BACKGROUND

1. Technical Field

The present disclosure generally relates to manipulators and, particularly, to a manipulator with a cable protection device.

2. Description of Related Art

Manipulators perform specific manual tasks, controlled by operation programs, such as gripping or handling objects. Manipulators allow the automatization and mechanization of manufacture processes. In addition, manipulators can operate in dangerous environments. Manipulators are widely used in machinery, metallurgy, electronics, light industry, atomic energy, and other fields.

A manipulator often includes a cable. Because of the repeated motion of the manipulator, the cable is easily worn if directly fixed to the device. Often a gum or spring casing is coated on the cable, which, while avoiding cable wear, increases the diameter of the cable in addition to increasing costs.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
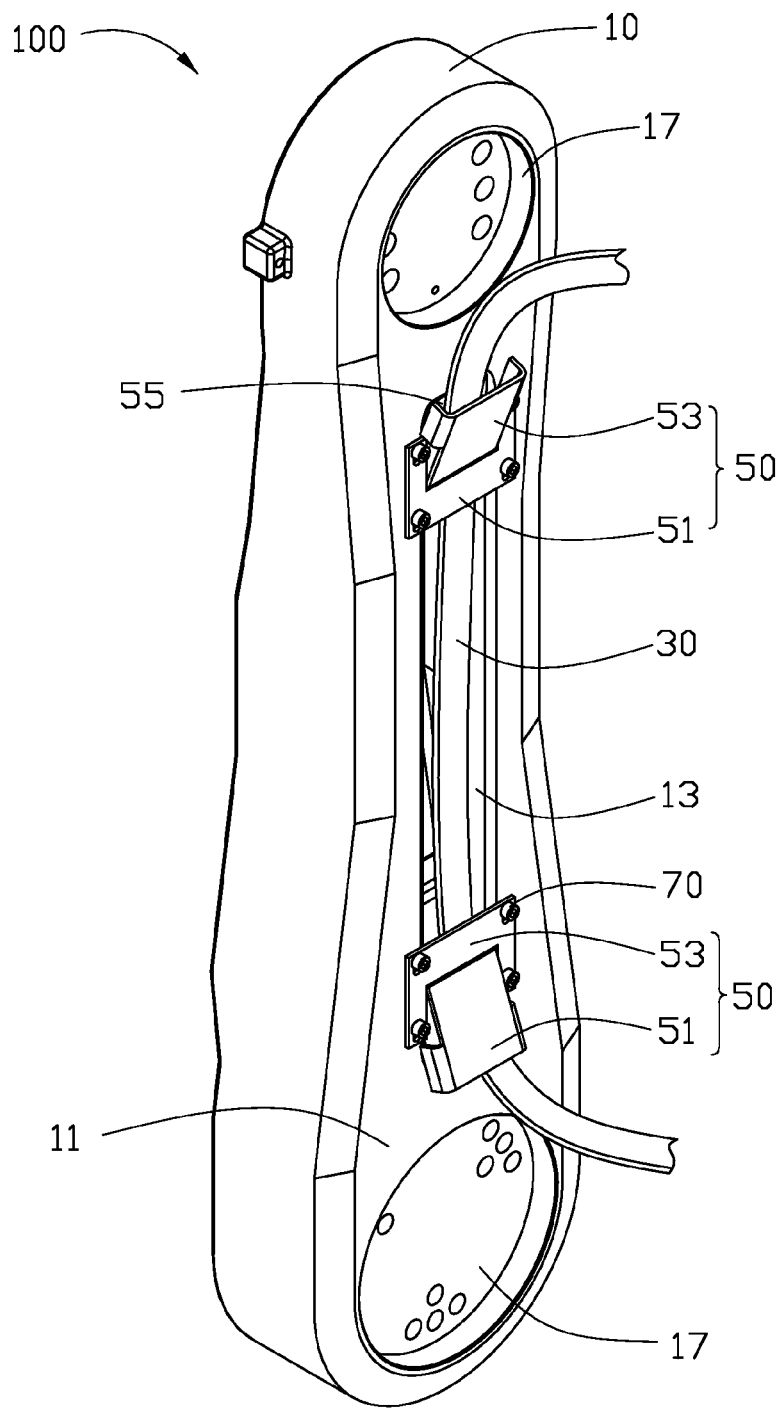
FIG. 1 is an assembled, isometric view of a manipulator.

Referring to FIG. 1, a manipulator 100 includes a mechanical arm 10, a cable 30 positioned in the mechanical arm 10, at least one cable protection device 50, and a plurality of fasteners 70. The at least one cable protection device 50 is fixed to the mechanical arm 10 by the fasteners 70.

Figure 2:
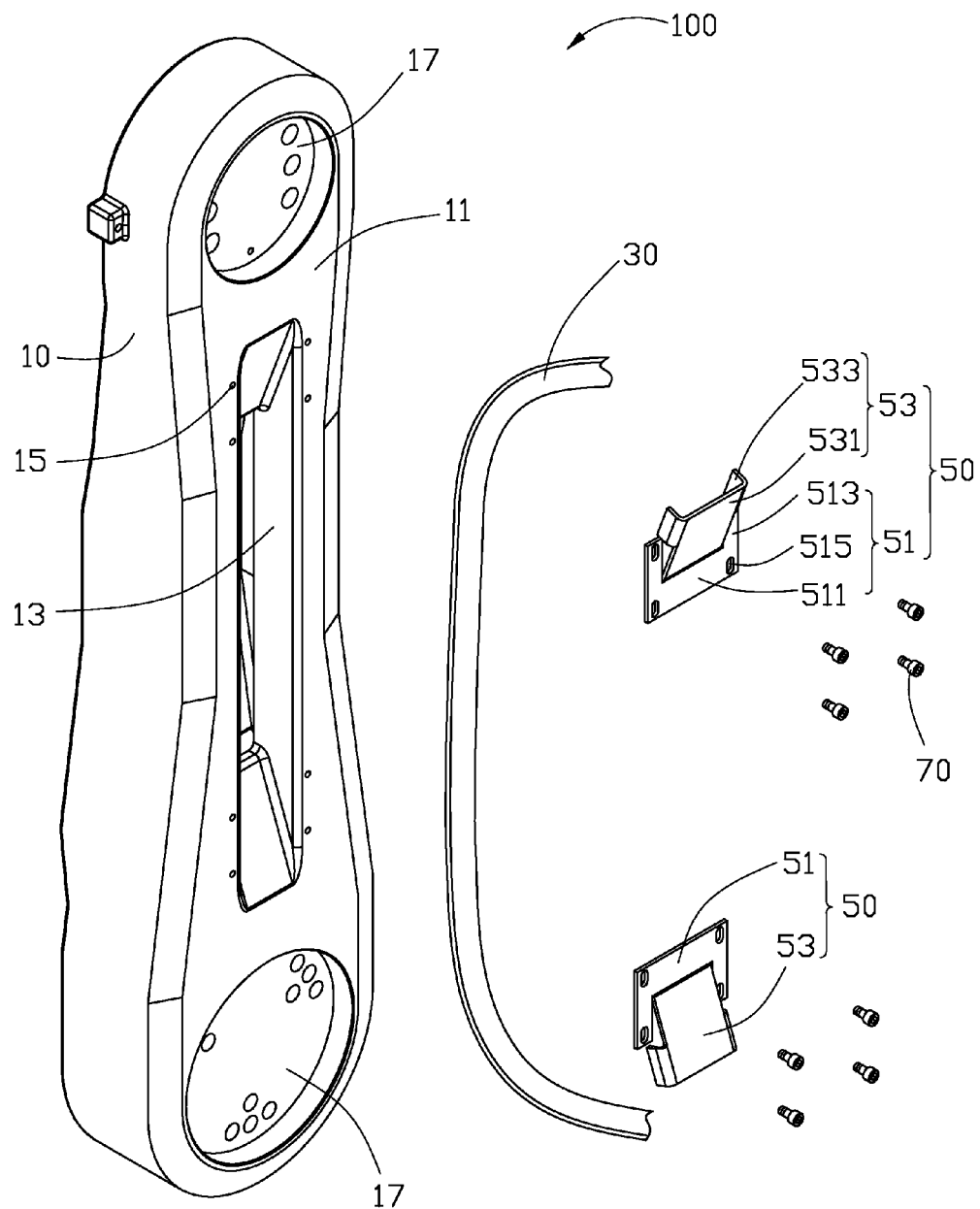
FIG. 2 is an exploded, isometric view of the manipulator of FIG. 1.

Referring to FIG. 1 and FIG. 2, the mechanical arm 10 includes a surface 11, and the mechanical arm 10 defines a rectangular receiving slot 13, at least one fixing hole 15, and at least one connecting slot 17. In the illustrated embodiment, there are eight fixing holes 15 defined in the mechanical arm 10 opposite to each other, and arranged on opposite sides of the receiving slot 13, and two connecting slots 17 in opposite ends of the mechanical arm 10.

The cable 30 is partially received in the receiving slot 13, with opposite ends extending outside two ends thereof.

The cable protection device 50 includes a fixing member 51 and a resilient arm 53 extending from the fixing member 51. In the illustrated embodiment, two cable protection devices 50 are fixed at the two ends of the receiving slot 13.

The fixing member 51 includes a base plate 511, two fixing portions 513 extending from the base plate 511, and at least one positioning slot 515. In the illustrated embodiment, there are four positioning slots 515 defined at the four corners of the base plate 511.

The resilient arm 53 extends at an angle from the base plate 511 and is arranged between the two fixing portions 513. The resilient arm 53 includes a main body 531 and two restricting portions 533 extending from two sides of the free end of the main body 531. The restricting portions 533 are opposite and located between the main body 531 and the surface 11 of the mechanical arm 10. The fixing member 51 and the resilient arm 53 may be integrally formed.

The fasteners 70 pass through the positioning slots 515 and are fastened into the fixing holes 15 to fix the cable protection device 50 to the mechanical arm 10. The diameter of the shaft of the fastener 70 is substantially the same as the width of the positioning slot 515, but less than the length of the positioning slot 515. Therefore, the fastener 70 can be positioned in the positioning slot 515 and move in the positioning slot 515 along the length of the positioning slot 515 by an external force, so that the position of the cable protection device 50, located on the mechanical arm 10, can be adjusted.

When the cable protection device 50 is fixed on the mechanical arm 10, part of the receiving slot 13 is covered by the fixing member 51. The cable 30 can be positioned by the base plate 511 of the fixing member 51 to prevent the cable 30 from dropping from the receiving slot 13. An opening 55 is formed between the resilient arm 53 and the mechanical arm 10, through which the cable 30 extends out of the receiving slot 13. When the manipulator 100 is operated, the cable 30 contacts the resilient arm 53, and the elastic swing of the resilient arm 53 reduces friction between the resilient arm 53 and the cable 30, thus protecting the cable 30 from abrasion. The fixing member 51 can be integrally formed with the resilient arm 53, so that the cable protection device 50 has a simple structure and low manufacturing cost.

In addition, the location of the fixing member 51 on the mechanical arm 10 can be adjusted according to different sizes of the cable, rendering the cable protection device 50 applicable to a variety of environments.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A manipulator, comprising:
    a robotic mechanical arm defining a receiving slot;
    a cable connecting to the mechanical arm and received in the receiving slot; and
    at least one cable protection device comprising a fixing member comprising a base plate and two fixing portions extending from the base plate, and a resilient arm extending from the base plate at an angle located between the two fixing portions, wherein the base plate is located across the receiving slot, and the two fixing portions are respectively fixed to the mechanical arm at two sides of the receiving slot; the resilient arm comprises a main body and two restricting portions extending from opposite sides of the free end of the main body, the cable is located between the base plate and the resilient arm of the cable protection device and the mechanical arm, and the resilient arm is capable of swinging relative to the base plate.

2. The manipulator of claim 1, wherein the fixing member defines at least one positioning slot; the mechanical arm defines at least one fixing hole; and the manipulator further comprises at least one fastener extending through the at least one positioning slot and the at least one fixing hole to connect with the at least one cable protection device.

3. The manipulator of claim 2, wherein a diameter of the shaft of the fastener is substantially the same as the width of the positioning slot, but less than a length of the positioning slot.

4. The manipulator of claim 1, wherein the at least one cable protection device comprises two cable protection devices, respectively positioned at opposite ends of the receiving slot.

5. The manipulator of claim 1, wherein the fixing member and the resilient arm are integrally formed.

6. The manipulator of claim 1, wherein the mechanical arm defines at least one connecting slot.

7. The manipulator of claim 6, wherein the at least one connecting slot comprises two connecting slots, respectively arranged at two ends of the mechanical arm.

8. A manipulator, comprising:
   A robotic mechanical arm defining a receiving slot;
   a cable connected to the mechanical arm and received in the receiving slot; and
   at least one cable protection device comprising a fixing member comprising a base plate and two fixing portions extending from the base plate, and a resilient arm extending from the base plate located between the two fixing portions, wherein the base plate is located across the receiving slot, and the two fixing portions are respectively fixed to the mechanical arm at two sides of the receiving slot; the resilient arm comprises a main body and two restricting portions extending from opposite sides of the free end of the main body, the resilient arm elastically contacts the cable, and the resilient arm is capable of swinging relative to the base plate.

9. The manipulator of claim 8, wherein at least one opening is formed between the resilient arm and the mechanical arm, and at least one end of the cable extends outside of the receiving slot through the at least one opening.

10. The manipulator of claim 9, wherein the at least one cable protection device comprises two cable protection devices, respectively positioned at opposite ends of the receiving slot; the at least one opening comprises two openings, out of which opposite ends of the cable correspondingly extend outside of the receiving slot.

11. The manipulator of claim 8, wherein the fixing member and the resilient arm are integrally formed.

* * * * *